April 8, 1924.　　　　　　　　　　　　　　　　1,489,641
M. O. JOHNSON
APPARATUS FOR CONCENTRATING SOLUTIONS
Filed Sept. 19, 1921
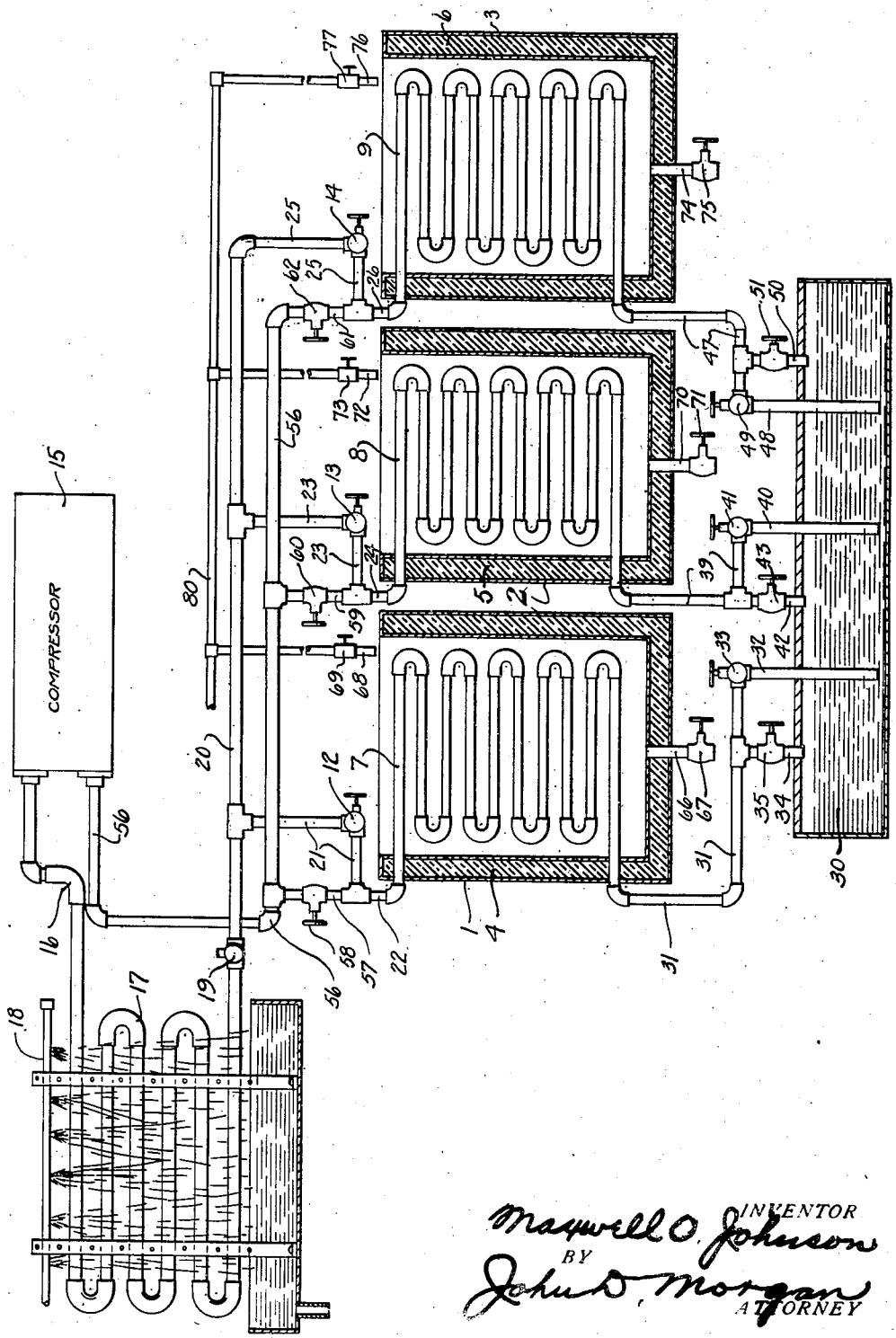
INVENTOR
Maxwell O. Johnson
BY
John D. Morgan
ATTORNEY Patented Apr. 8, 1924.

1,489,641

UNITED STATES PATENT OFFICE.

MAXWELL O. JOHNSON, OF WAIPIO, TERRITORY OF HAWAII.

APPARATUS FOR CONCENTRATING SOLUTIONS.

Application filed September 19, 1921. Serial No. 501,857.

*To all whom it may concern:*

Be it known that I, MAXWELL O. JOHNSON, a citizen of the United States, residing at Waipio, in the county of Honolulu, Territory of Hawaii, have invented certain new and useful Improvements in Apparatus for Concentrating Solutions, of which the following is a specification.

The invention relates to a process and apparatus for concentrating solutions by freezing, and more particularly to such process and apparatus in which the concentration is simplified and facilitated, and regenerative features are employed.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, processes, constructions, arrangements, combinations and improvements herein shown and described.

The accompanying drawings, herein referred to and constituting a part hereof, illustrate certain steps in the process and a present preferred embodiment of apparatus employed in carrying out the same, the drawings being more or less diagrammatic in character.

Of the drawings:

The figure is an elevation, partly diagrammatic of a part of an apparatus advantageously employed in carrying out the invention.

By the present invention, the relation of the different agencies and parts involved are inter-related so that the frozen-out solid is employed without handling to regenerate the refrigerating medium, and the same instrumentality is employed alternately or alternatively (1) to freeze out the solvent or diluent and thereby concentrate the solution and (2) with the ice so formed subsequently to act as a condenser or regenerative agent for the refrigerating medium.

The term "solvent" is used in a broad sense to indicate any less dense component of a liquid which will freeze out at a lower temperature than the freezing temperature of another component of the liquid, and the term "solution" is also used in a more or less broad sense, both, being used as convenient single words to illustrate this class of liquids.

More in detail, a series of tanks are employed, each tank having therewithin a pipe coil connected to the refrigerating apparatus; one of the tanks is filled with the dilute solution, and the refrigerating medium is run through the coils of this tank to cause the solvent or diluent to freeze out of the solution upon the pipe coil; at the same time the ice upon the pipe coil in another tank is acting as a condenser, the ice on such coil being melted in condensing the refrigerating medium which is circulating through the coils of this tank. The tanks are used alternatively, or in succession, to concentrate the solution and to regenerate the refrigerating medium by means of the frozen-out solvent or diluent.

It will be understood that the foregoing and following description is not restrictive in its character, but is exemplary and explanatory of the invention.

By my invention, as preferably practiced, I allow the medium of refrigeration, such as ammonia, to expand directly in coils of pipe immersed in the solution to be concentrated, to cause the solvent or diluent to freeze out in fairly pure form on the coils, and thereby to concentrate the solution. When the desired degree of concentration of the solution is obtained, it may be drawn off, leaving the solvent frozen upon the coils. Any remaining concentrated solution held in the frozen solvent may be drained off by slow and partial thawing.

This pipe coil is next used as the condenser of the refrigerating apparatus, and the energy consumed in freezing the solvent can now be recovered through the melting of the ice and be employed in chilling the refrigerating medium. Also, by reason of melting the ice on the pipe coil the resulting liquid can be easily and readily drained off without labor or special apparatus for handling it, as is the case with ice.

Referring now in detail to the drawings, a plurality of heat insulated tanks 1, 2 and 3 are employed, the insulation being indicated, respectively, by 4, 5 and 6. I prefer to use a group or cycle of three tanks, although two tanks may be employed, or a larger number than three, should this be found convenient or desirable. Within the tank 1 is a pipe coil, or series of pipe coils 7, and a similar pipe coil or series 8 is within the tank 2, and a like coil or series 9, is located within the tank 3.

The compressed hot gas or other refrigerating medium comes from the compressor or equivalent apparatus 15, through a pipe 16, into a pre-cooling coil 17. The coil 17 is cooled to a limited or desired extent by suitable means, such as water-spraying pipes 18, this entire mechanism being preferably of some standard or adequate form. The partly cooled gas or other refrigerating medium passes from the pre-cooler 17 through a check valve 19 into a pipe 20.

This pipe is connected to each of the coils 7, 8 and 9, so that they may be used alternately, selectively, or alternatively therewith, as desired. For this purpose, a pipe 21 communicates between the pipe 20 and a pipe 22, which communicates with the coil 7. Pipe 21 is provided with a valve 12. In like manner, a pipe 23 communicates with the pipe 24, which pipe in turn communicates with the coil 8 of the tank 2. Pipe 23 is provided with a valve 13. Similarly a pipe 25 communicates with a pipe 26, which pipe communicates with the coil 9 of the tank 3. Pipe 25 is provided with a valve 14.

The various coils in the tanks communicate also with the receiver 30 of the refrigerating apparatus. For this purpose the lower end of coil 7 in tank 1 connects with a pipe 31, and from pipe 31 a pipe 32 extends into the receiver 30, and is provided with an expansion valve 33. A pipe 34 (which serves as a by-pass when coil 7 is acting as a condenser for the regrigerant) likewise communicates between the pipe 31 and the receiver 30, and is provided with a valve 35.

Similarly a pipe 39 connects with the lower end of the pipe coil 8 in tank 2, and a pipe 40 communicates from pipe 39 with the receiver 30, this pipe being supplied with an expansion valve 41. A pipe 42 (which serves as a by-pass when coil 8 is acting as a condenser for the refrigerant) also communicates between pipe 39 and receiver 30, and is provided with a valve 43.

In like manner a pipe 47 communicates from the pipe coil 9 in tank 3 with a pipe 48, which latter pipe communicates with the receiver 30 and is provided with an expansion valve 49. A pipe 50, which serves as a bypass (when coil 9 is acting as a condenser for the refrigerant) also communicates between pipe 47 and the receiver 30, and is provided with a valve 51.

The pipe coils 7, 8 and 9, respectively, also communicate at their upper ends with the suction pipe 56, that is, the pipe which conveys away the expanded gas to the compresser, or absorber, of the refrigerating system.

For this purpose and for the coil 7, a pipe 57 communicates from pipe 22 to pipe 56 and is provided with a valve 58. In the case of the coil 8, a pipe 59 communicates between the pipe 24 and the pipe 56 and is provided with a valve 60. For the coil 9, a pipe 61 communicates between pipe 26 and pipe 56, and is provided with a hand valve 62.

Each of the tanks are also preferably provided with fluid outlets for draining and with fluid inlets for supply. As shown, tank 1 is provided with a discharge pipe 66, having a hand valve 67, and also with a supply pipe 68 having a hand valve 69. Tank 2 is similarly provided with a discharge pipe 70, having a hand valve 71, and with a supply pipe 72 having a hand valve 73. In like manner, tank 3 has a discharge pipe 74, with a hand valve 75, and a supply pipe 76, with a hand valve 77. The supply pipes, respectively, may be connected through a pipe 80 to a source of supply for the dilute solution, and also to a source of supply for water or other cooling medium for the coils, when this latter is required or desired.

The present preferred manner of carrying out the process in connection with the apparatus just described, is substantially as follows:

In initially starting the apparatus the tank 1 is filled with the solution to be concentrated, and as none of the coils 7, 8 or 9 is ice-covered until later in the process, water is circulated through tank 3 by means of the pipes 76 and 74, so that the pipe coil 9 will be chilled and will act as a condenser for the ammonia gas, or other refrigerating medium. The expansion valves 33, 41 and 49 are preferably left always open to the proper or correct degree. The valve 14, the valve 51 and the valve 58 are open, the other valves being closed.

The refrigerating liquid passes from the receiver 30, through the expansion valve 33, into the pipe coil 7 of tank 1, where it vaporizes, thereby freezing out the solvent or diluent on the coil 7, and concentrating the solution in the tank 1.

The vaporized ammonia, or other medium of refrigeration, passes through the valve 58 into the pipe 56, which is on the suction side of the compressor, or absorber, of the refrigerating system, and the cold and expanded gas is drawn into the compressor and is again compressed and thereby heated.

The hot compressed medium of refrigeration passes from the compression side of the compressor through pipe 16, into the fore-cooler 17 where it is cooled to a desired or pre-determined degree or extent. From the fore-cooler the hot compressed refrigerating medium passes through check-valve 19 into pipe 20, and through the valve 14 into the pipe coils 9 of the tank 3. Here it is condensed or liquefied, and it flows thence through pipe 47 and pipe 50 into the receiver 30. It will be understood that the use of water to cool the pipe-coils to condense or liquefy the refrigerating medium is required only in starting up the apparatus, as this function is thereafter effected by the ice which is formed on the pipe coils during the concentration of the solution.

When the solution in tank 1 is concentrated to a required or sufficient degree by the freezing out of the solvent or diluent, the valve 58 is closed, thereby shutting off the flow of liquid refrigerant through coil 7 from the receiver 30. The concentrated solution is drained off from the tank 1 through pipe 66. Any concentrated solution which may be held in the solvent or diluent which has been frozen out on the surface of the pipe-coils 7 is allowed to drain off during the freezing period of tank 2.

While the concentration operation has been going on in tank 1 the dilute solution has been flowed into tank 2, preferably sufficiently to fill it. Valve 60 is then opened, and the liquid refrigerant is drawn from the receiver 30 and vaporizes and expands in coils 8, and the solvent or diluent is frozen out from the solution in tank 2 upon the pipe coils 8, and the solution in tank 2 is correspondingly concentrated, as have already been described in connection with the corresponding operation in tank 1. The tank 3 with coil 9 water cooled as before, may be utilized to condense the hot ammonia gas, or other refrigerating medium, as was done when the solution in tank 1 was being concentrated.

By the time that the solution in tank 2 has been concentrated to the required degree, tank 1 has been drained of the concentrated solution, and, with pipe coils 7 covered with ice, is now ready to act as the condenser or liquefier for the refrigerating medium. From this point on, as long as the process is continued, the ice frozen out of the solution on to the pipe-coils during the concentration of the solution will take the place as a condensing or liquefying agent for the refrigerant of the water which was flowed over the coils, as was described in connection with tank 3 when the solution was being initially concentrated in tank 1.

Valves 12 and valve 35 are opened and valves 60, 14 and 51 are closed. The water is drawn off from tank 3 through pipe 74, and tank 3 is filled with the dilute solution ready for concentration. Valve 62 is then opened, thereby drawing the refrigerating medium from the receiver 30, said medium being vaporized in the pipe coils 9, and is drawn off through the pipe 56, the solution in tank 3 being thereby concentrated, the solvent or diluent freezing out upon coils 9, in the manner already described.

The pipe coils 7, which are coated with the frozen solvent, now act as the condenser or liquefier for the refrigerant. They operate to provide a very low condensing pressure, and the energy consumed or absorbed in freezing the solvent or diluent is thus recovered into the system. The frozen solvent is melted during the operation and the resultant liquid may be disposed of without labor and without special machinery.

The flow of cooling water over the pre-cooling coils 17 is regulated so that the ice or frozen solvent upon the pipe coils 7, in tank 1 will be completely melted when the solution in tank 3 is concentrated to the desired or required degree by the freezing operation, the pipe coils thereby being kept clear of accumulated ice. The melted solvent in tank 1 is then drawn off through pipe 66, and tank 1 is re-filled through pipe 68 with fresh dilute solution. Tank 3 is now drained of the concentrated solution, and tank 2 is employed as the condenser or liquefier of the refrigerating medium. The cycle of operations may be continued indefinitely in the manner already described.

The duration of the concentrating operation and the other concomitant operations will depend on several factors, such as the size of the piping, the spacing of the coils and their length, the degree of concentration desired, the ratio of pipe surface area to the capacity of the tank, the pressure and temperature of expansion, as well as other factors.

If the dilute solution is of little value, as occurs in some cases, it may be more economical to omit the draining period and have only two tanks acting alternately in the freezing and condensing operations.

In the case of certain solutions, agitation during freezing or concentration of the solution is desirable, but in the case of other solutions the reverse may be the case. Where desirable or advantageous, this may be effected by any suitable means, such as a screw, compressed air, or a circulating pump.

It is usually desirable that the coils within the tank, whatever the shape of the tank and of the coils, should be closer together in a vertical than in a horizontal direction so that the solvent will freeze in vertical and not in horizontal sheets, and will thereby facilitate instead of impeding the draining off of the concentrated soution.

The invention in its broader aspects is not limited to the precise manner of practicing the process or to the particular form of apparatus shown and described, but changes may be made therein without departing from the principles of the invention and without sacrificing its chief advantages.

What I claim is:—

An apparatus for concentrating solutions by freezing, comprising a compressor, a plurality of freezing tanks each provided with a coil, a primary series of valved pipes respectively connecting one end of the several coils to the pressure side of the compressor, a primary series of valved by-pass pipes respectively connecting the same ends of the coils to the suction side of the compressor, a receiver, a second series of pipes, each provided with an expansion valve, respectively connecting the opposite ends of the several coils to the receiver, and a second series of by-pass pipes, each provided with a valve, respectively connected to each of said second series of pipes and to the receiver whereby the movement of the refrigerating medium into and out of the receiver is controlled by manipulation of the valves in the two said primary series of pipes and of the valves in the two said second series of pipes, while the expansion valves remain in the same position.

In testimony whereof, I have signed my name to this specification.

MAXWELL O. JOHNSON.